(12) United States Patent  (10) Patent No.: US 8,199,796 B2
Yousef  (45) Date of Patent: Jun. 12, 2012

(54) PHYSICAL LAYER AWARE VIDEO ENCODING FOR MOBILE TV APPLICATIONS

(75) Inventor: Nabil R. Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 1572 days.

(21) Appl. No.: 11/615,283

(22) Filed: Dec. 22, 2006

(65) Prior Publication Data

US 2008/0152001 A1  Jun. 26, 2008

(51) Int. Cl.
H04B 1/66 (2006.01)
(52) U.S. Cl. .................... 375/219; 375/240.08
(58) Field of Classification Search .......... None
See application file for complete search history.

(56) References Cited

U.S. PATENT DOCUMENTS

| 6,075,561 A | 6/2000 | Janko |
| 2002/0080873 A1 | 6/2002 | Yoo |
| 2004/0034863 A1* | 2/2004 | Barrett et al. .......... 725/38 |
| 2006/0092906 A1 | 5/2006 | Paila et al. |
| 2006/0120670 A1 | 6/2006 | Lee |

FOREIGN PATENT DOCUMENTS

WO  WO 2006031925 A2 *  3/2006

* cited by examiner

Primary Examiner — Thai Tran
Assistant Examiner — Sunghyoun Park
(74) Attorney, Agent, or Firm — Rahman LLC

(57) ABSTRACT

A system and method of transmitting video in a time division multiplexing (TDM) system, wherein the method comprises identifying a video reference frame from a series of video frames; encoding a difference between the video reference frame and a video non-reference frame; placing the video reference frame at a beginning of a data burst; transmitting the series of video frames and the data burst from a transmitter to a mobile TV receiver; and the mobile TV receiver immediately locating the video reference frame upon receipt of the data burst. The method may further comprise the mobile TV receiver decoding the series of video frames. Additionally, the placing process results in a substantially non-existent channel switching delay in the mobile TV receiver. Moreover, the method may further comprise placing exactly one video reference frame at the beginning of the data burst. Preferably, the TDM system comprises a mobile TV system.

7 Claims, 3 Drawing Sheets

PHYSICAL LAYER AWARE VIDEO ENCODING FOR MOBILE TV APPLICATIONS

BACKGROUND

1. Technical Field

The embodiments herein generally relate to wireless technologies, and, more particularly, to mobile television (TV) technologies.

2. Description of the Related Art

In mobile TV Digital Video Broadcasting over Handheld (DVB-H) systems such as DVB-H (ETSI EN 301 192), one radio frequency (RF) channel is shared among many TV channels (TV programs). These TV channels are multiplexed either in the time domain or in the frequency domain. When the TV channels are multiplexed in the time domain, each channel is given full access to the entire RF channel bandwidth for a short period of time (burst duration). After that burst is transmitted, bursts for other channels occupy the RF channel and so on. This multiplexing process is called time division multiplexing (TDM). FIG. 1 illustrates an example of time division multiplexing of 15 TV channels on one RF channel. The TV channels are labeled 1, 2, 3, ..., 15. In FIG. 1, it is shown that each TV channel occupies the entire RF channel for 1/15 of the time. A receiver which is watching only one channel (for example, channel 2) needs only to be active (ON) during the periods of channel 2 bursts. In order to conserve battery consumption, such a receiver will typically shut off its circuits when channel 2 bursts are not occupying the RF channel. The receiver thus enters into a SLEEP mode. This shows that the TDM of channels can help reduce power consumption of a receiver watching a single channel.

On the other hand, this causes a problem when the user wants to switch to watch another TV channel on the same RF channel. One example is shown in FIG. 1, if the user wishes to switch to Channel 3 (denoted by Channel UP in FIG. 1). The worst case occurs when the user issues a command to switch to Channel 3 right after the burst of Channel 3 ends. In this case, the receiver has to wait until the next burst that belongs to Channel 3 appears on the RF channel. This causes the user to wait for a given period of time denoted as the channel switching delay. Such a delay could be as long as 5 to 7 seconds in DVB-H systems. Such channel switching delay could be rather annoying to the user. This delay is known as the delay in the physical layer or the PHY delay.

In addition to the PHY delay, there is an additional delay in the physical layer that arises from the nature of the video encoding process. Digital video encoding techniques normally treat a video signal as a stream of still pictures (video frames). The encoding process starts by encoding one frame independently of other frames. Such a frame is called the reference frame (I-frame). For the following frames, the video encoder finds the difference between each frame and the reference frame. The video encoder encodes only this difference in order to reduce the bit rate of the encoded video stream. In practice the size of a reference frame is significantly larger than a regular frame (P-frame). Video encoders transmit I-frames at a low rate that could be as low as one reference frame per second.

At the receiver, video frames are generally received in order. When the user switches to a given channel, the receiver waits for the first available reference frame to start decoding the video. The video decoder neglects all P-frames until it finds the first I-frame. After receiving the first I-frame, the video decoder can now decode all frames and the user can then start watching video. The amount of time between receiving a given channel and finding the first reference frame is a delay in the overall channel switching operation. The worst case delay depends on how often reference frames are transmitted. For example, if reference frames are transmitted once per second, then the worst case time delay is one second. In order to reduce such a delay, the transmitter has to transmit reference frames at a high rate, which could reduce the overall channel capacity as reference frames are significantly larger than normal frames. Accordingly, there remains a need for a new video encoding technique for mobile TV applications.

SUMMARY

In view of the foregoing, an embodiment provides a method of transmitting video in a TDM system, wherein the method comprises identifying a video reference frame from a series of video frames; encoding a difference between the video reference frame and a video non-reference frame; placing the video reference frame at a beginning of a data burst; transmitting the series of video frames and the data burst from a transmitter to a mobile TV receiver; and the mobile TV receiver immediately locating the video reference frame upon receipt of the data burst. The method may further comprise the mobile TV receiver decoding the series of video frames. Additionally, the placing process results in a substantially non-existent channel switching delay in the mobile TV receiver. Moreover, the method may further comprise placing exactly one video reference frame at the beginning of the data burst. Preferably, the TDM system comprises a mobile TV system.

Another embodiment provides a system for transmitting video in a TDM environment, wherein the system comprises a TV channel transmitter comprising a video encoder adapted to identify a video reference frame from a series of video frames and encode a difference between the video reference frame and a video non-reference frame; and a first encapsulator adapted to place the video reference frame at a beginning of a data burst, wherein the TV channel transmitter is adapted to transmit the series of video frames and the data burst. The system further comprises a mobile TV receiver in communication with the TV channel transmitter, wherein the mobile TV receiver comprises a video decoder adapted to receive the transmitted series of video frames and the data burst; and a second encapsulator adapted to immediately locate the video reference frame upon receipt of the data burst.

Preferably, the video decoder is adapted to decode the series of video frames. Also, placement of the video reference frame at the beginning of the data burst preferably results in a substantially non-existent channel switching delay in the mobile TV receiver. Furthermore, the first encapsulator may be adapted to place exactly one video reference frame at the beginning of the data burst. Moreover, the first encapsulator may be adapted to feed back to the video encoder a timing of the beginning of the data burst. Additionally, the video encoder may be adapted to identify a duration of the data burst and a duty cycle of the first encapsulator, and wherein the video encoder is adapted to generate the video reference frame at a same duty cycle as that being generated by the first encapsulator. Preferably, the second encapsulator is adapted to locate the video reference frame coming from the video decoder, and wherein the second encapsulator is adapted to link the beginning of the data burst to a location of the video reference frame. Also, the TDM environment preferably comprises a mobile TV environment.

Another embodiment provides a system of transmitting video in a TDM system, wherein the system comprises means for identifying a video reference frame from a series of video frames; means for encoding a difference between the video reference frame and a video non-reference frame; means for placing the video reference frame at a beginning of a data burst; means for transmitting the series of video frames and the data burst from a transmitter to a mobile TV receiver; and means for the mobile TV receiver immediately locating the video reference frame upon receipt of the data burst. The mobile TV receiver may further comprise means for decoding the series of video frames. Additionally, the placing of the video reference frame at the beginning of the data burst preferably results in a substantially non-existent channel switching delay in the mobile TV receiver. Moreover, the system may further comprise means for placing exactly one video reference frame at the beginning of the data burst. Also, the TDM system may comprise a mobile TV system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a new video encoding technique for mobile TV applications. The embodiments herein achieve this by providing techniques for reducing the channel switching delay in TDM mobile TV systems such as DVB-H and MediaFlo™ that arises from the placement of reference frames.

Figure 2:
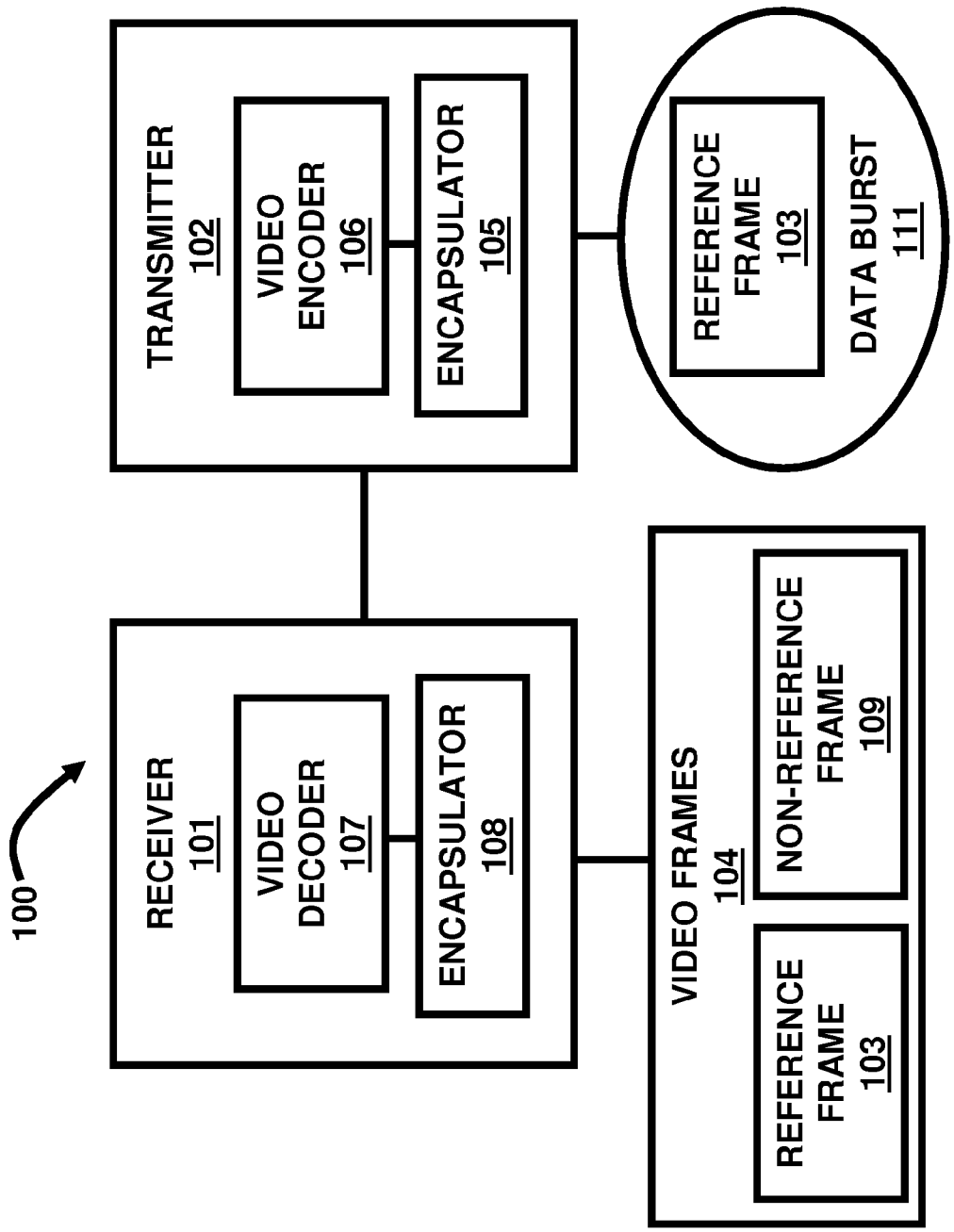
FIG. 2 is a schematic diagram illustrating a system according to an embodiment herein.
Figure 3:
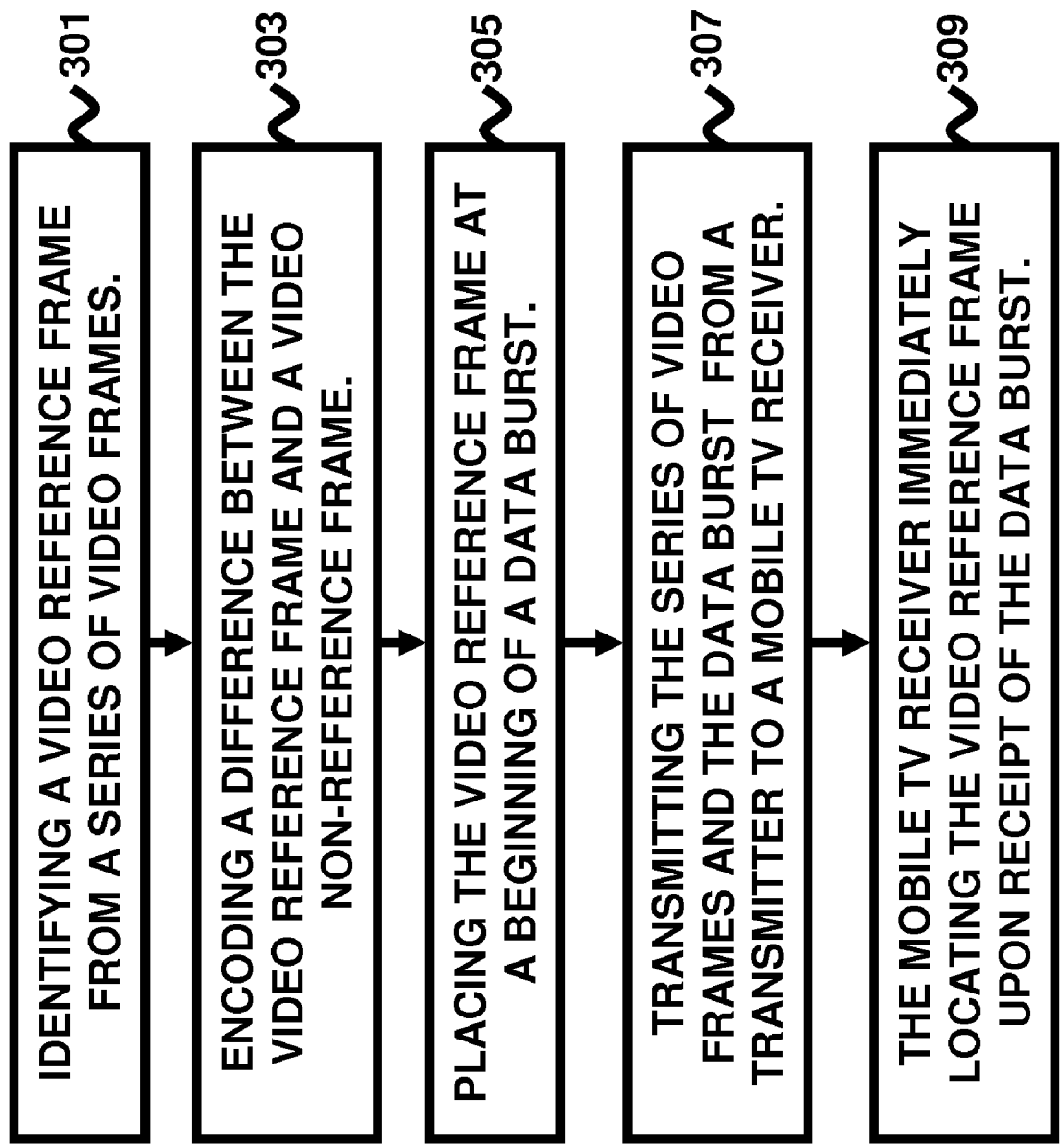
FIG. 3 is a flow diagram illustrating a preferred method according to an embodiment herein.

Referring now to the drawings, and more particularly to FIGS. 2 and 3, where similar reference characters denote corresponding features consistently throughout the figures, there are shown preferred embodiments. In order to reduce the channel switching delay due to placement of reference frames, one or many of the following embodiments could be used, as indicated in FIG. 2, which illustrates a communication system 100 comprising a receiver 101 and a transmitter 102, wherein the transmitter 102 places a reference frame 103 at the start of each data burst 111.

The transmitter 102 makes sure that a reference frame 103 exists at the beginning of each data burst 111. The transmitter 102 is adapted to place reference frames 103 at arbitrary time instants. The transmitter 102 has access to the un-coded video frames. A reference frame 103 corresponds only to one video frame, while a non-reference frame 109 contains the difference between the current video frame and the previous video frames. Thus, placing a reference frame 103 at a given instance in time simply means that the transmitter 102 sends the actual video frame corresponding to this specific instance and not the difference. This way, when the receiver 101 starts receiving frames 104 at the start of the data burst 111, the receiver 101 finds a reference frame 103 immediately. This reduces the delay due to placement of reference frames 103 to zero if the receiver 101 wakes up (from a sleep mode of operation) before the data burst 111.

Alternatively, the transmitter 102 places only one reference frame 103 in each data burst 111, which is at the start of the data burst 111. This significantly reduces the amount of data required for sending the encoded video. For example, if a data burst 111 is transmitted every five seconds and the reference frame rate is one reference frame/second, then each data burst would normally include five reference frames 103. If one now sends only one reference frame 103 in each data burst 111, one may save four reference frames 103 per data burst 111 and thus reduce the overall bit rate needed. This still guarantees that the receiver 101 will correctly decode the video in the data burst 111 if it wakes up (from a sleep mode of operation) before the data burst 111 and thus gets the only reference frame 103 in the data burst 111.

If the receiver 101 wakes up in the middle of the data burst 111, thereby missing the only reference frame 103, then the receiver 101 waits for the next data burst 111 to get a reference frame 103. However, since the duty cycle of the data bursts 111 is usually very low, the probability of the receiver 101 waking up (from a sleep mode of operation) during any given data burst 111 is very low.

Preferably, the encapsulator 105, which is responsible for the data burst timing control, feeds back to the video encoder 106, which is responsible for inserting reference frames 103 the timing of the data burst start. The video encoder 106 ensures that a reference frame 103 is inserted at the start of the data burst 111. If the video encoder 106 knows the time instant of a reference frame 103 it simply sends the actual frame at this instant and not the frame difference.

The video encoder 106 knows the burst duration and duty cycle from the encapsulator 105 and generates reference frames 103 at the same duty cycle. Moreover, the encapsulator 108 locates the reference frames 103 coming from the video decoder 107 and adapts the start of the data burst 111 to the location of the reference frames 103. The encapsulator 108 is adapted to place the start of data bursts 111 at any time instance. Once the encapsulator 108 locates the time instance of a reference frame 103 (a reference frame 103 has a header that could be detected), it places the data burst start at this time instance.

Figure 1:
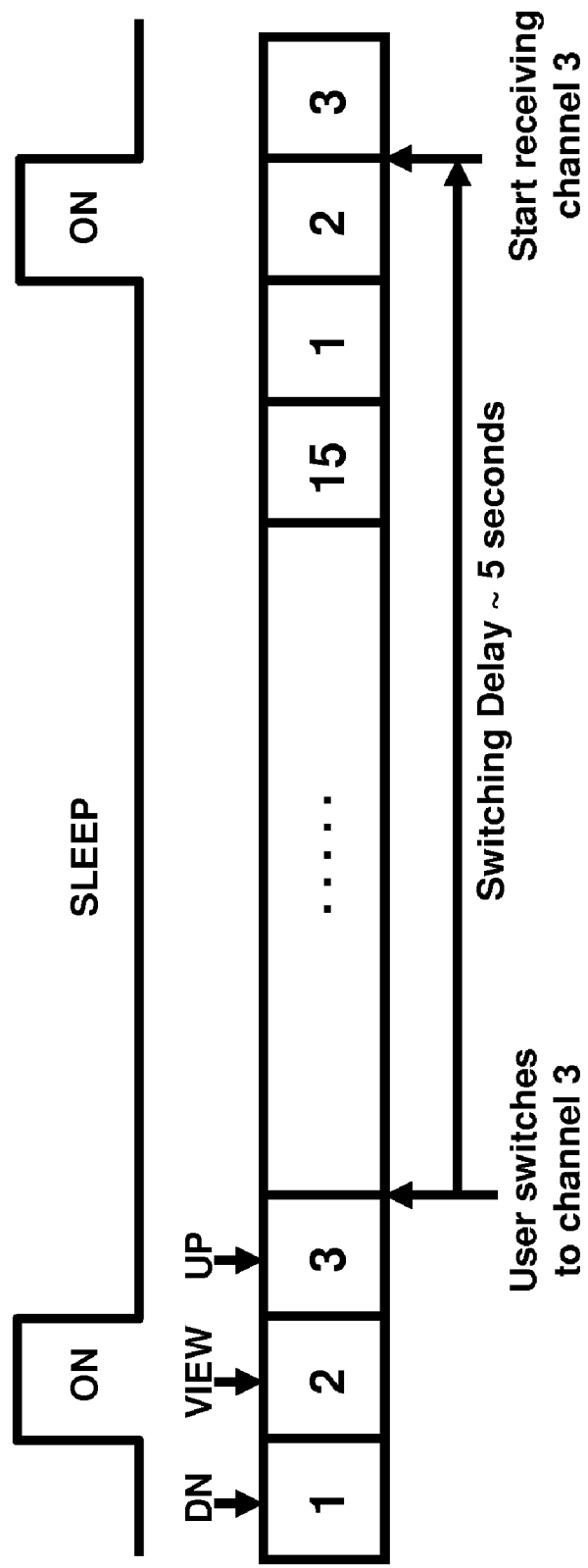
FIG. 1 is a schematic diagram illustrating a burst sequence.

FIG. 3, with reference to FIGS. 1 and 2, is a flow diagram illustrating a method of transmitting video in a TDM system 100, wherein the method comprises identifying (301) a video reference frame 103 from a series of video frames 104; encoding (303) a difference between the video reference frame 103 and a video non-reference frame 109; placing (305) the video reference frame 103 at a beginning of a data burst 111; transmitting (307) the series of video frames 104 and the data burst 111 from a transmitter 102 to a mobile TV receiver 101; and the mobile TV receiver 101 immediately locating (309) the video reference frame 103 upon receipt of the data burst 111. The method may further comprise the mobile TV receiver 101 decoding the series of video frames 104. Additionally, the placing process (305) results in a substantially non-existent channel switching delay in the mobile TV receiver 101. Moreover, the method may further comprise placing exactly one video reference frame 103 at the beginning of the data burst 111. Preferably, the TDM system 100 comprises a mobile TV system.

The techniques provided by the embodiments herein may be implemented on an integrated circuit (IC) chip or using printable electronic technologies (not shown). The chip or printable electronic circuit design is created in a graphical computer programming language, and stored in a computer storage medium (such as a disk, tape, physical hard drive, or virtual hard drive such as in a storage access network). If the designer does not fabricate chips or printable electronic circuits or the photolithographic masks used to fabricate chips or printable electronic circuits, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII or CIF) for the fabrication of photolithographic masks, which typically include multiple copies of the chip design in question that are to be formed on a wafer or printed on a suitable substrate. The photolithographic masks are utilized to define areas of the wafer or printable electronic circuits (and/or the layers thereon) to be etched or otherwise processed or printed.

The resulting integrated circuit chips or printable electronic circuits can be distributed by the fabricator in raw wafer form (that is, as a single wafer that has multiple unpackaged chips), as a bare die, or in a packaged form or as individual printed circuits or in a sheet or roll of printed circuits. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip might then be integrated with other chips, discrete circuit elements, and/or other signal processing devices as part of either (a) an intermediate product, such as a mother or daughter-board, or (b) an end product. The end product can be any product that includes integrated circuit chip or chips and/or printed circuits, ranging from toys and other low-end applications to advanced computer products having a display, a keyboard or other input device, and a central processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for transmitting video in a time division multiplexing (TDM) environment, said system comprising:
    a TV channel transmitter comprising:
        a video encoder that identifies a video reference frame from a series of video frames and encode a difference between said video reference frame and a video non-reference frame; and
        a first encapsulator that places said video reference frame at a beginning of a data burst and feeds back to said video encoder a timing of a beginning of said data burst,
        wherein said TV channel transmitter transmits said series of video frames and said data burst, and
        wherein said video encoder identifies a duration of said data burst and a duty cycle of said first encapsulator, and wherein said video encoder generates said video reference frame at a same duty cycle as that being generated by said first encapsulator,
    a mobile TV receiver in communication with said TV channel transmitter, said mobile TV receiver comprising:
        a video decoder that receives the transmitted series of video frames and said data burst; and
        a second encapsulator that immediately locates said video reference frame upon receipt of said data burst.

2. The system of claim 1, wherein said video decoder decodes said series of video frames.

3. The system of claim 1, wherein placement of said video reference frame at said beginning of said data burst results in a substantially reduced channel switching delay in said mobile TV receiver.

4. The system of claim 1, wherein said first encapsulator places exactly one video reference frame at said beginning of said data burst.

5. The system of claim 1, wherein said first encapsulator provides timing of said beginning of said data burst to said video encoder.

6. The system of claim 1, wherein said second encapsulator locates said video reference frame coming from said video decoder, and wherein said second encapsulator links said beginning of said data burst to a location of said video reference frame.

7. The system of claim 1, wherein said TDM environment comprises a mobile TV environment.

* * * * *